US009987839B2

(12) United States Patent
Jeng et al.

(10) Patent No.: US 9,987,839 B2
(45) Date of Patent: Jun. 5, 2018

(54) PHOTOCURABLE RESIN AND THREE-DIMENSIONAL PRINTING SYSTEM

(71) Applicant: National Taiwan University of Science and Technology, Taipei (TW)

(72) Inventors: Jeng-Ywan Jeng, Taipei (TW); Fu-Teng Jhang, Taipei (TW); Rimma Shafikova, Taipei (TW); Sarjono Tri, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 232 days.

(21) Appl. No.: 15/064,032

(22) Filed: Mar. 8, 2016

(65) Prior Publication Data

US 2016/0264696 A1      Sep. 15, 2016

(30) Foreign Application Priority Data

Mar. 10, 2015 (TW) .............................. 104107504 A

(51) Int. Cl.
| | |
|---|---|
| C08F 2/46 | (2006.01) |
| C08F 2/50 | (2006.01) |
| C08G 61/04 | (2006.01) |
| B33Y 70/00 | (2015.01) |
| B33Y 30/00 | (2015.01) |
| B29C 64/129 | (2017.01) |
| B29K 105/24 | (2006.01) |
| B29K 33/00 | (2006.01) |
| B29C 35/08 | (2006.01) |

(52) U.S. Cl.
CPC ............ B33Y 70/00 (2014.12); B29C 64/129 (2017.08); B33Y 30/00 (2014.12); *B29C 2035/0833* (2013.01); *B29K 2033/08* (2013.01); *B29K 2105/24* (2013.01)

(58) Field of Classification Search
CPC .... C08F 120/68; C08F 120/28; C08F 120/18; B29K 2105/24; B29K 2033/08; B29C 2035/0833; B29C 67/0088; B29C 67/0066; B29C 67/0092; B29C 35/0805; B29C 64/129; B33Y 30/00; B33Y 70/00
USPC ................... 522/7, 6, 71, 189, 184, 1; 520/1
See application file for complete search history.

(56) References Cited

U.S. PATENT DOCUMENTS

2010/0136467 A1* 6/2010 Matsumoto .......... C07D 209/86
430/7

FOREIGN PATENT DOCUMENTS

TW         I450935 B      9/2014

OTHER PUBLICATIONS

1st Office Action of counterpart Taiwanese Patent Application No. 104107504 dated Oct. 22, 2015.

* cited by examiner

*Primary Examiner* — Jessica Whiteley

(57) ABSTRACT

A photocurable resin composition for three-dimensional printing which is visible-light curable is provided, comprising a photosensitive prepolymer in a range of 76.5 wt % to 96.8 wt %, a photoinitiator in a range of 0.01 wt % to 5 wt %, an auxiliary photoinitiator in a range of 0.01 wt % to 15 wt %, and a solvent in a range of 0.01 to 10 wt %. A three-dimensional printing system comprises: an accommodation unit, a lifting unit, a formation unit, and a control unit. The accommodation unit is for accommodating a printing material. The formation unit, which is connected to the lifting unit, can be driven by the lifting unit so as to move with respect to a light emission unit. The control unit, coupled to the lifting unit, controls motion of the lifting unit. The light emission unit may be a mobile electronic device, a display device, or a digital television.

4 Claims, 10 Drawing Sheets

PHOTOCURABLE RESIN AND THREE-DIMENSIONAL PRINTING SYSTEM

CROSS-REFERENCES TO RELATED APPLICATION

This non-provisional application claims priority under 35 U.S.C. § 119(a) on Patent Application No. 104107504 filed in Taiwan, R.O.C. on Mar. 10, 2015, the entire contents of which are hereby incorporated by reference.

BACKGROUND

Technical Field

The present disclosure relates generally to a photocurable resin, and particularly to a photocurable resin composition for three-dimensional printing and a three-dimensional printing system.

Related Art

A fused deposition modeling (Fused Deposition Modeling, FDM) technology is generally adopted in most of common three-dimensional printing machines. In FDM process, a linear material is heated and extruded through a nozzle to produce a three-dimensional workpiece by way of stack of layers. As a result, a long time is required for formation of a three-dimensional article, and also several disadvantages and defects such as printing failure, warping, etc. are easily occurred since high intense expansion and contraction during printing by FDM process.

Further, an improved three-dimensional printing method of sequentially projecting patterns onto a photo-curable resin, layer by layer is also employed. By this method, after one layer is formed, the object under printing is then slightly raised while a new pattern for another layer is projecting. By repeating the procedures as above mentioned, a desired three-dimensional object is accordingly formed. For making mask patterns, among currently known techniques, digital light processing (DLP) is mostly utilized by state art. According to the DLP method, mask patterns are generally formed through ultraviolet lights by a micro projector and an ultraviolet curable resin is usually utilized as a printing material. During printing, the mask patterns for an object to be printed are projected onto the printing material by a micro projector of a three-dimensional DLP printing system, and the printing material is then cured due to cross-linking reaction, whereby a product of the object may be formed by repeating the same procedures thereof.

A light-curing system for three-dimensional printing may be available in a general commercial market. However, depending on the light source and print material used in printing, it often causes several disadvantages such as: high energy consumption, environmental toxicity, ultraviolet light damage, harmful to users' health, higher manufacturing costs, and so on. For example, in the DLP printing systems, a laser light source with a frequency band of ultraviolet lights, a near-ultraviolet light source, LED of 405 nm wavelength or another is used to make the ultraviolet curable resins hardened for the formation of the product of an object, and operation costs of which are expensive since high-energy consumption of light sources and has no goodness in commercialization and popularization. Further, the system hardware cost is increased by including a hardware device for protection the eyes of the users from harmfulness while using ultraviolet rays. Besides, during the three-dimensional printing, the resolution is deteriorated since an increased projection distance and an increased projection area are required for the micro-projection projector. Additionally, ultraviolet curable resin used as printing materials generally includes epoxy acrylic resin composition, which has odor and/or toxic to the users and environment.

Therefore, in view of the restrictions on the use of ultraviolet light source and ultraviolet resin printing material as described above, the conventional three-dimensional printing systems such as DLP and others are required to be further improved.

SUMMARY

Accordingly, the invention provides a photocurable resin composition that is capable of being cured by the absorption of visible lights and provides a three-dimensional printing system using the photocurable resin composition as a printing material. The three-dimensional printing system is thus facilitated to utilize a visible light source, such as an electronic device with a screen (such as a display device, e.g., LCD, of a mobile electronic device), for displaying masks for forming a three-dimensional object, avoiding harmfulness of the ultraviolet as well as saving energy. The visible light source can be configured to have a reduced projection distance, which makes a high resolution can be maintained even if the three-dimensional printing system according to the invention is implemented for three-dimensional printing with a large area.

According to an aspect of the invention, a photocurable resin composition is provided, comprising: a photosensitive prepolymer in a range of 76.5 wt % to 96.8 wt %, a photoinitiator in a range of 0.01 wt % to 5 wt %, an auxiliary photoinitiator in a range of 0.01 wt % to 15 wt %, and a solvent in a range of 0.01 to 10 wt %. The photocurable resin composition is visible-light curable. For example, the photocurable resin composition is curable through absorption of a visible light with a wavelength in a range of 400 nm to 700 nm.

In an embodiment, the photosensitive prepolymer comprises at least one selected from the group consisting of butyl acrylate, methyl methacrylate, isobornylacrylate, hydroxyethyl methacrylate, caprolactone acrylate, isodecylacrylate, polyethylene glycol monoacrylate, 2-phenoxyethyl methacrylate, 1,6-ethylene glycol diacrylate, dipropylene glycol diacrylate, ethoxylated bisphenol A diacrylate, propoxylated neopentyl glycol diacrylate, triethylene glycol dimethacrylate, trimethylol propane triacrylate, pentaerythritol triacrylate.

In an embodiment, the photosensitive prepolymer comprises at least one selected from the group consisting of butyl acrylate, methyl methacrylate, isobornylacrylate, hydroxyethyl methacrylate, caprolactone acrylate, isodecylacrylate, polyethylene glycol monoacrylate, 2-phenoxyethyl methacrylate, 1,6-ethylene glycol diacrylate, dipropylene glycol diacrylate, ethoxylated bisphenol A diacrylate, propoxylated neopentyl glycol diacrylate, triethylene glycol dimethacrylate, trimethylol propane triacrylate, pentaerythritol triacrylate.

In an embodiment, the photoinitiator comprises at least one selected from the group consisting of benzoin, benzoin dimethyl ether, benzoin ethyl ether, benzoin isopropyl ether, benzoin ether, diphenyl ethanone, α,α-dimethoxy-α-phenylacetophenone, α,α-diethoxyacetophenone, α-hydroxy alkyl ketones, α-amine alkylphenones, aromatic acyl phosphine oxide, bisphenylmethoxy acyl phosphine oxide, benzophenone, 2,4-dihydroxy-benzophenone, fluorone, thiopropionate group thioxanthone, isopropyl thioxanthone, diaryl iodonium salt, triaryl iodonium salt, alkyl iodonium salt, cumene ferrocene hexafluorophosphate.

In an embodiment, the auxiliary photoinitiator comprises at least one selected from the group consisting of N,N,N-triethylamine, N-methyl maleate (PEI), N-ethylmaleimide (PEI), triethanolamine, N-phenyl glycine, acetyl-phenyl-glycine, chlorophenyl glycine, 3-bromophenyl glycine, ethylammonium borate, and acrylamide esters.

In an embodiment, the solvent includes dimethylacetamide.

According to another aspect of the invention, a three-dimensional printing system, comprises: an accommodation unit, a lifting unit, a formation unit, and a control unit. The accommodation unit is used for accommodating a printing material. The formation unit is connected to the lifting unit and capable of being driven by the lifting unit so as to move with respect to a light emission unit, wherein the light emission unit includes a display device. The control unit, coupled to the lifting unit, is used for controlling motion of the lifting unit.

In an embodiment, the light emission unit generates a visible light having a wavelength in a range of 400 nm to 700 nm.

In an embodiment, during printing, the display device of the light emission unit is used for displaying a mask, and the control unit controls the motion of the lifting unit with respect to the mask.

In an embodiment, during printing, a surface of the accommodation unit faces the light emission unit, and the formation unit moves correspondingly with respect to the surface of the accommodation unit.

In an embodiment, the light emission unit is a mobile electronic device, a display device, or a digital television.

In an embodiment, the control unit communicates with the light emission unit via a wired link or a wireless link.

In an embodiment, the three-dimensional printing system further comprises the light emission unit.

For better understanding of the above and other aspects of the invention, a plurality of embodiments or examples will be taken with accompanying drawings to provide detailed description as follows.

DETAILED DESCRIPTION

Figure 1:
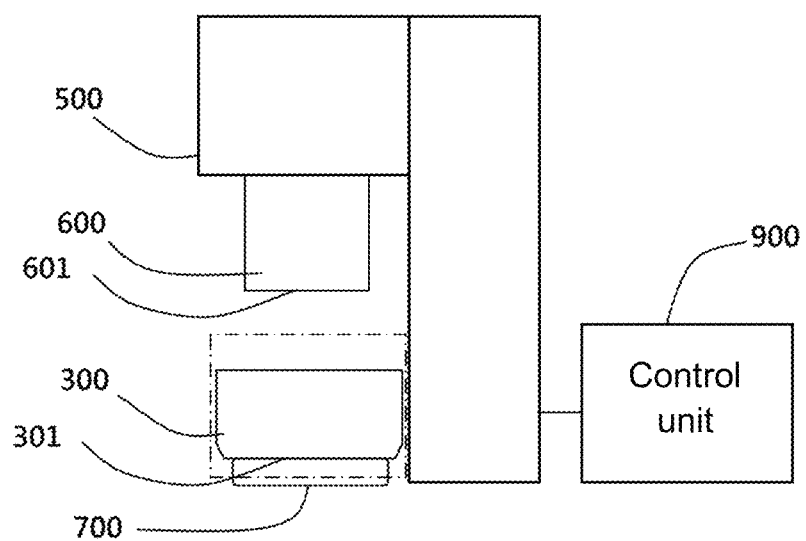
FIG. 1 is a block diagram illustrating a three-dimensional printing system, according to an aspect of the invention.

Above and other related technical content prior to the present invention, the features and function, in the following with reference to the embodiment of the drawings in detail, it will be clearly presented. The following examples direction in terms embodiment mentioned, for example: up, down, left, right, front or rear, etc., only with reference to the accompanying drawings, direction. Thus, the direction is to illustrate the use of the term is not intended to limit the present invention.

A variety of aspects of photocurable resin compositions and three-dimensional printing system are provided for illustration.

In an aspect of the invention, a photocurable resin composition which is curable through absorption of a visible light is provided. Accordingly, visible light sources can be utilized in three-dimensional printing systems to form three-dimensional objects from a printing material such as the photocurable resin composition. The photocurable resin composition used in the aspect of the invention generally comprises a photosensitive prepolymer in a range of 76.5 wt % to 96.8 wt %, a photoinitiator in a range of 0.01 wt % to 5 wt %, an auxiliary photoinitiator in a range of 0.01 wt % to 15 wt %, and a solvent in a range of 0.01 to 10 wt %. The photocurable resin composition is curable through absorption of a visible light with a wavelength in a range of 400 nm to 700 nm, for example. However, the invention is not limited to the above exemplary numeral ranges.

In an embodiment, the photosensitive prepolymer, preferably, comprises at least one selected from the group consisting of butyl acrylate, methyl methacrylate, isobornylacrylate, hydroxyethyl methacrylate, caprolactone acrylate, isodecylacrylate, polyethylene glycol monoacrylate, 2-phenoxyethyl methacrylate, 1,6-ethylene glycol diacrylate, dipropylene glycol diacrylate, ethoxylated bisphenol A diacrylate, propoxylated neopentyl glycol diacrylate, triethylene glycol dimethacrylate, trimethylol propane triacrylate, pentaerythritol triacrylate. Nevertheless, the invention is not limited thereto, and other photosensitive can also be utilized. According to the aspect of the invention, the amount of the photosensitive prepolymer is not particularly limited. In some embodiments, for example, the amount of the photosensitive prepolymer may be, but not limited to, in a range of 73.5 wt % to 99.8 wt %, or 74.5 wt % to 98.8 wt %, or 75.5 wt % to 97.8 wt %, or 76.5 wt % to 96.8 wt %, or 77.5 wt % to 95.8 wt %, or 78.5 wt % to 94.8 wt %, or 79.5 wt % to 93.8 wt %, or 80.5 wt % to 92.8 wt %, or 81.5 wt % to 91.8 wt %, or 82.5 wt % to 90.8 wt %, or 83.5 wt % to 89.8 wt %, or 84.5 wt % to 88.8 wt %, or 85.5 wt % to 87.8 wt %, with respect to a total amount of the photocurable resin composition.

In an embodiment, the photoinitiator, preferably, comprises at least one selected from the group consisting of benzoin, benzoin dimethyl ether, benzoin ethyl ether, benzoin isopropyl ether, benzoin ether, diphenyl ethanone, α,α-dimethoxy-α-phenylacetophenone, α,α-diethoxyacetophenone, α-hydroxy alkyl ketones, α-amine alkylphenones, aromatic acyl phosphine oxide, bisphenylmethoxy acyl phosphine oxide, benzophenone, 2,4-dihydroxy-benzophenone, fluorone, thiopropionate group thioxanthone, isopropyl thioxanthone, diaryl iodonium salt, triaryl iodonium salt, alkyl iodonium salt, cumene ferrocene hexafluorophosphate. According to the aspect of the invention, the amount of the photoinitiator is not particularly limited. In some embodiments, for example, the amount of the photoinitiator may be, but not limited to, in a range of 0.01 wt % to 5 wt %, or 0.1 wt % to 4.9 wt %, or 0.2 wt % to 4.8 wt %, or 0.3 wt % to 4.7 wt %, or 0.4 wt % to 4.6 wt %, or 0.5 wt % to 4.5 wt %, with respect to a total amount of the photocurable resin composition.

In an embodiment, the photoinitiator comprises at least one selected from the group consisting of a benzoin indium-based compound, a benzoin acyl compound, a benzene-based compound, an acyl phosphorus oxide, a benzophe-none-based compound, a thioxanthone based compounds and their derivatives, diazonium salts, diaryl iodonium salts, triaryl iodonium salts, a triaryl silicon oxide ether, triaryl sulfonium salts, iron arene salts, alkyl iodonium salts, cumene ferrocene hexafluorophosphate, sulfonyloxyl ketone, and a mixture thereof.

In an embodiment, the photoinitiator comprises at least one selected from the group consisting of 2-hydroxy-2-methyl-1-phenyl acetone, 1-hydroxy cyclohexyl phenyl ketone, 2-methyl-2-(4-morpholinyl)-1-[4-(methylthio)phe-nyl]-1-propanone, 2,4,6-trimethyl benzoyl group-diphenyl phosphine oxide, 2,4,6-trimethyl benzoyl diphenylphos-phine ethyl group, 2-dimethylamino-2-benzyl-1-[4-(4-mor-pholinyl)phenyl]-1-butanone, hydroxy-2-methyl-1-[4-(2-hydroxyethoxy)phenyl]-1-propanone, benzoyl methyl formate, and a mixture thereof.

In an embodiment, the auxiliary photoinitiator comprising at least one selected from the group consisting of N,N,N-triethylamine, N-methyl maleate (PEI), N-ethylmaleimide (PEI), triethanolamine, N-phenyl glycine, acetyl-phenyl-glycine, chlorophenyl glycine, 3-bromophenyl glycine, eth-ylammonium borate, and acrylamide esters. According to the aspect of the invention, the amount of the auxiliary photoinitiator is not particularly limited. In some embodiments, for example, the amount of the auxiliary photoini-tiator may be, but not limited to, in a range of 0.01 wt % to 15 wt %, or 0.51 wt % to 14.5 wt %, or 1.01 wt % to 14.0 wt %, or 1.51 wt % to 13.5 wt %, or 2.01 wt % to 13.0 wt %, or 2.51 wt % to 12.5 wt %, with respect to total amount of the photocurable resin composition.

In an embodiment, the solvent includes dimethylacet-amide. However, the invention is not limited thereto, and other organic solvent can be used. According to the aspect of the invention, the amount of the solvent is not particularly limited. In some embodiments, for example, the amount of the solvent may be, but not limited to, in a range of 0.01 to 10 wt %, or 0.51 wt % to 9.5 wt %, or 1.01 wt % to 9.0 wt %, or 1.51 wt % to 8.5 wt %, with respect to total amount of the photocurable resin composition.

In addition, in an embodiment, the photocurable resin composition is prepared by using using a light initiator that is curable through absorption of a light having a wavelength in a range of 400 nm to 700 nm.

According to another aspect of the present invention, a three-dimensional printing system is provided, which can utilize the above-mentioned photocurable resin composition as a printing material, so that the three-dimensional printing can be performed by using a light emission unit which is capable of displaying masks using visible lights, such as mobile electronic devices (such as smart phone, tablet PC), a display device (such as a liquid crystal display, or various OLED display/panel) or digital TV (such as LCD TV, plasma TV, OLED TV, and so on). In one practical example, this three-dimensional printing system can be configured to utilize any electronic device with a display screen as a light emission unit, such as smart phones, tablet PCs; the user can dispose the electronic device in the three-dimensional print-ing system for three-dimensional printing, and then remove the electronic device from the three-dimensional printing system after the three-dimensional printing is completed. In another practical example, the three-dimensional printing system may be configured to have a built-in light emission unit, and the user can make the light emission unit of this three-dimensional printing system to display masks for three-dimensional printing by utilizing an electronic device, as exemplified above, to communicate with the system in a wired or wireless manner. The following provides the embodiments of the three-dimensional printing systems, which can be configured to arrive at the two practical examples above.

Referring to FIG. 1, a block diagram illustrates a three-dimensional printing system, according to an aspect of the invention. In FIG. 1, the three-dimensional printing system comprises an accommodation unit 300, a lifting unit 500, a formation unit 600, and a control unit 900.

The accommodation unit 300 is used for accommodating a printing material; the printing material includes a resin that is capable of being cured due to light absorption, such as any one of the above examples of the photocurable resin composition. During printing, a first surface 301 of the accommodation unit 300 faces the light emission unit 700, and the formation unit 600 moves correspondingly with respect to the first surface 301 of the accommodation unit 300.

The formation unit 600 is connected to the lifting unit 500 and capable of being driven by the lifting unit 500 so as to move with respect to the light emission unit 700. The formation unit 600 makes displacement with respect to the first surface 301 of the accommodation unit 300 so as to facilitate the curing of the printing material on the formation unit 600 (such as on a formation surface 601 of the formation unit 600), thereby performing three-dimensional printing.

The light emission unit 700 can be any light source unit capable of displaying visible lights, such as any electronic device with a display screen, for example, the above-exemplified electronic device, a display device, digital television, and so on. For instance, the light emission unit 700 generates a visible light having a wavelength in a range of 400 nm to 700 nm. For example, various flat or curved displays such as LCD, OLED, and so on of electronic devices can be served as the light emission unit.

The control unit 900, coupled to the lifting unit 500, is used for controlling the motion of the lifting unit 500, according to the masks displayed by the light emission unit 700. For example, the control unit 900 communicates with the light emission unit 700 via a wired or wireless link (such as wireless communication, e.g., Wi-Fi, Bluetooth or other), whereby the control unit 900 controls the motion of the lifting unit 500, with respect to the pattern of the masks displayed by the light emission unit 700, according to the requirement for three-dimensional printing. Since the pattern of the masks change according to a cross-section file for the object to be printed, the control unit 900 controls an amount of displacement for the lifting unit 500 and a time period of waiting for the displacement. The object is then formed by accumulation of thin layers which are generated corresponding to the cross-sections indicated in the cross-section file.

Figure 2:
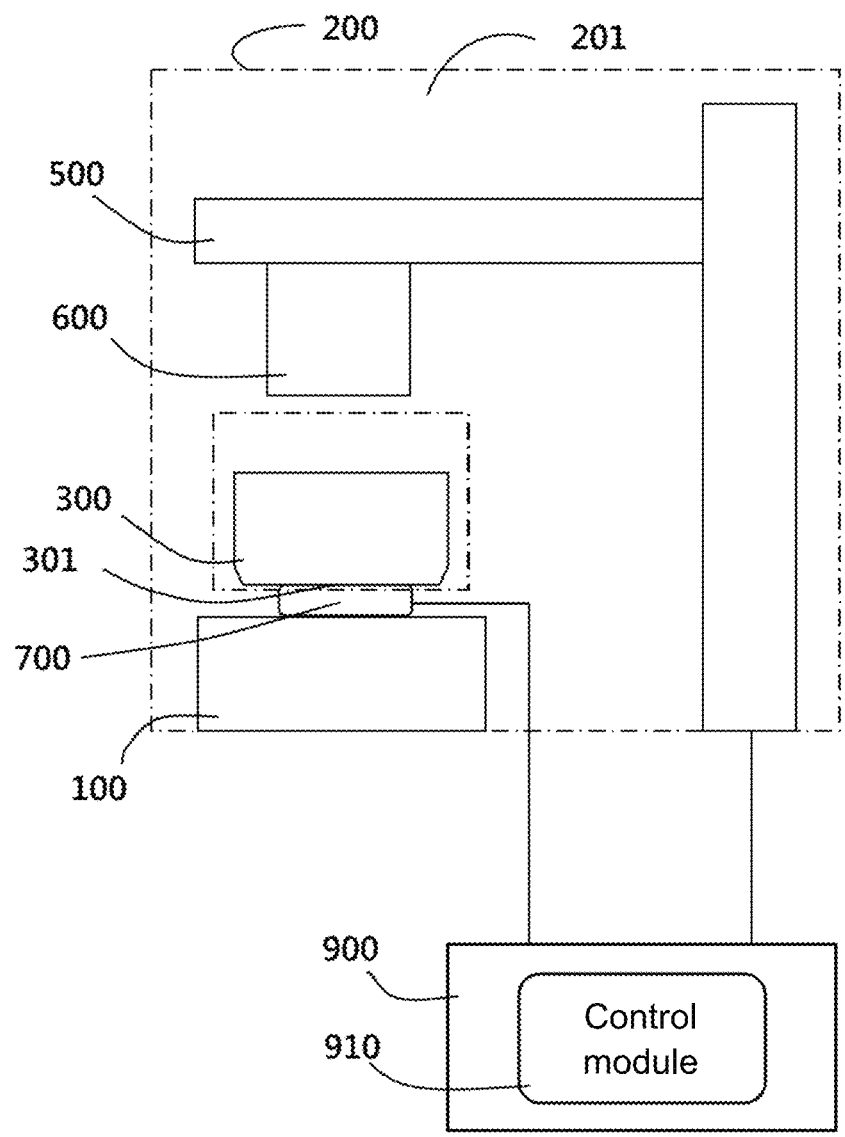
FIG. 2 is a block diagram illustrating a three-dimensional printing system, according to another aspect of the invention.

FIG. 2 is a block diagram illustrates a three-dimensional printing system, according to another aspect of the invention. As compared with FIG. 1, the embodiment illustrated in FIG. 2 further includes a base 100, which can be realized by using a mechanism for securing or holding the light emission unit 700, and the control unit 900 in FIG. 2 can be configured to electrically coupled to communicatively linked to the lifting unit 500 and/or the light emission unit 700 by using at least one signal line (or via a network). In this embodiment, the control unit 900 can be any electronic device capable of data processing, such as mobile electronic devices, computers (such as notebook computers, desktop computers), digital cameras. In a practical example, the user can make a printing command through the control unit 900, and the light emission unit 700 serves as a light source for displaying masks during three-dimensional printing.

In addition to making electrical connection to the control unit 900 by using at least one signal line, in an example, the light emission unit 700 can make communication with the control unit 900 via a wireless communication link and display a drawing file in synchronization with the drawing file displayed by the control unit 900 by using image software. For the execution of three-dimensional printing, the amounts of displacement (such as first, second, third displacement, and so on) for the lifting unit 500 and the waiting periods (such as first, second, third waiting period, and so on) for the displacement are stored in a memory of the control unit 900, or are implemented by a software program or firmware. The control unit 900 can communicate with the lifting unit 500 in a wired or wireless manner and controls the lifting unit 500 by using a control module 910 of the control unit 900 to output indication signals, so as to drive the formation unit 600 to move according to the change of lights from the light source.

In addition, the accommodation unit 300 can be a transparent or semi-transparent container for receiving a printing material, such as one of the above examples of photocurable resin composition. In order to prevent the curing of the photocurable resin composition of the invention and formation of the object from being influenced by any ambient light source, a cover 200 can be added in the system to cover the base 100 so as to form a darkroom 201, wherein the cover 200 can be an opaque box or a cover.

In addition, the invention can be implemented in other manners. For example, a darkroom can be formed by disposing a cover (or a housing of the system) over the region indicated by dotted-chain line in FIG. 1 or 2, or other region that avoid the influence of the ambient light source. In addition, the accommodation unit 300 can be configured to be a structure with its first surface 301 being transparent or semi-transparent, and other sides being opaque.

Figure 3:
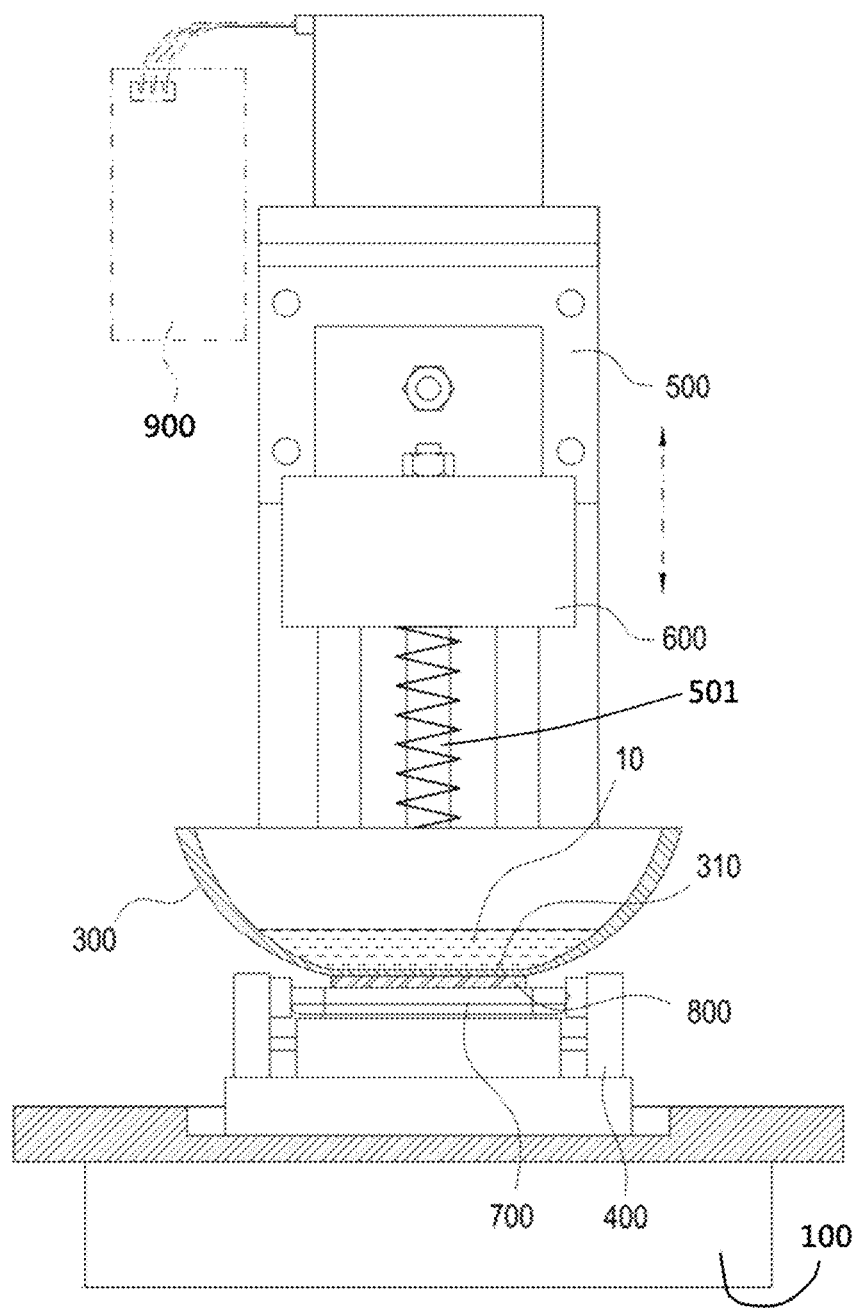
FIG. 3 is a cross-sectional view illustrating a three-dimensional printing system, according to an embodiment of the invention.

FIG. 3 is a cross-sectional view illustrating a three-dimensional printing system, according to an embodiment of the invention. In FIG. 3, the accommodation unit 300 of the three-dimensional printing system can be disposed above a holding part 400 and thus be aligned with the light emission unit 700. However, the invention is not limited thereto; and the accommodation unit 300 can be disposed over the light emission unit 700.

In an example, the formation unit 600 has at least one formation base; the formation base is disposed corresponding to an inner side (or the screen of the light emission unit 700) of a bottom surface 301 of the accommodation unit 300 and connected to the lifting unit 500, and can be driven by the lifting unit 500 and thus moves with respect to the bottom surface 310, such as moving upwards or downwards, or being still. The formation base is suspended and disposed above the accommodation unit 300; at least a portion of the formation base is contacted with the photocurable resin composition 10 contained in the accommodation unit 300, and facilitates the curing of the photocurable resin composition 10 and the formation of the object on the portion of the formation base. In addition, the lifting unit 500 may include a spiral rod 501 for driving the formation base to move freely along a direction with respect to the bottom surface 310 (or the screen of the light emission unit 700).

Figure 4:
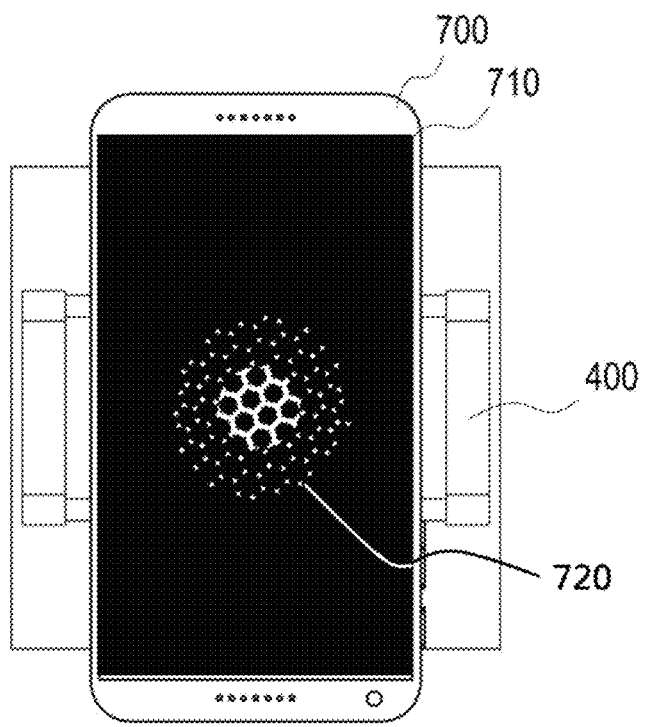
FIG. 4 is a schematic diagram illustrating a light emission unit, according to an embodiment of the invention.

FIG. 4 is a schematic diagram illustrating the configuration of a light emission unit, according to an embodiment of the invention. In FIG. 4, the light emission unit 700 is secured to the base 100 by using a holding part 400, and includes a flat light source 710 which is disposed facing a bottom surface 310 of the accommodation unit 300. In this example, the light emission unit 700 may be a mobile electronic device, and the flat light source 710 is a liquid crystal display (LCD), displaying a visible light with a wavelength in a range of 400 nm to 700 nm, equipped in the mobile electronic. The LCD is capable of displaying images serving as masks for three-dimensional printing, such as a mask 720 as illustrated in FIG. 4 being corresponding to a thin layer of a three-dimensional object.

In addition, since the backlight modules of general LCDs emit non-vertical lights, a polarizer can be added above the LCD. Further, the energy of the light source of the LCD can be increased so as to compensate for the loss due to the lights goes through the polarizer, and polarizer can be replaced with a condenser lens.

Figure 5:
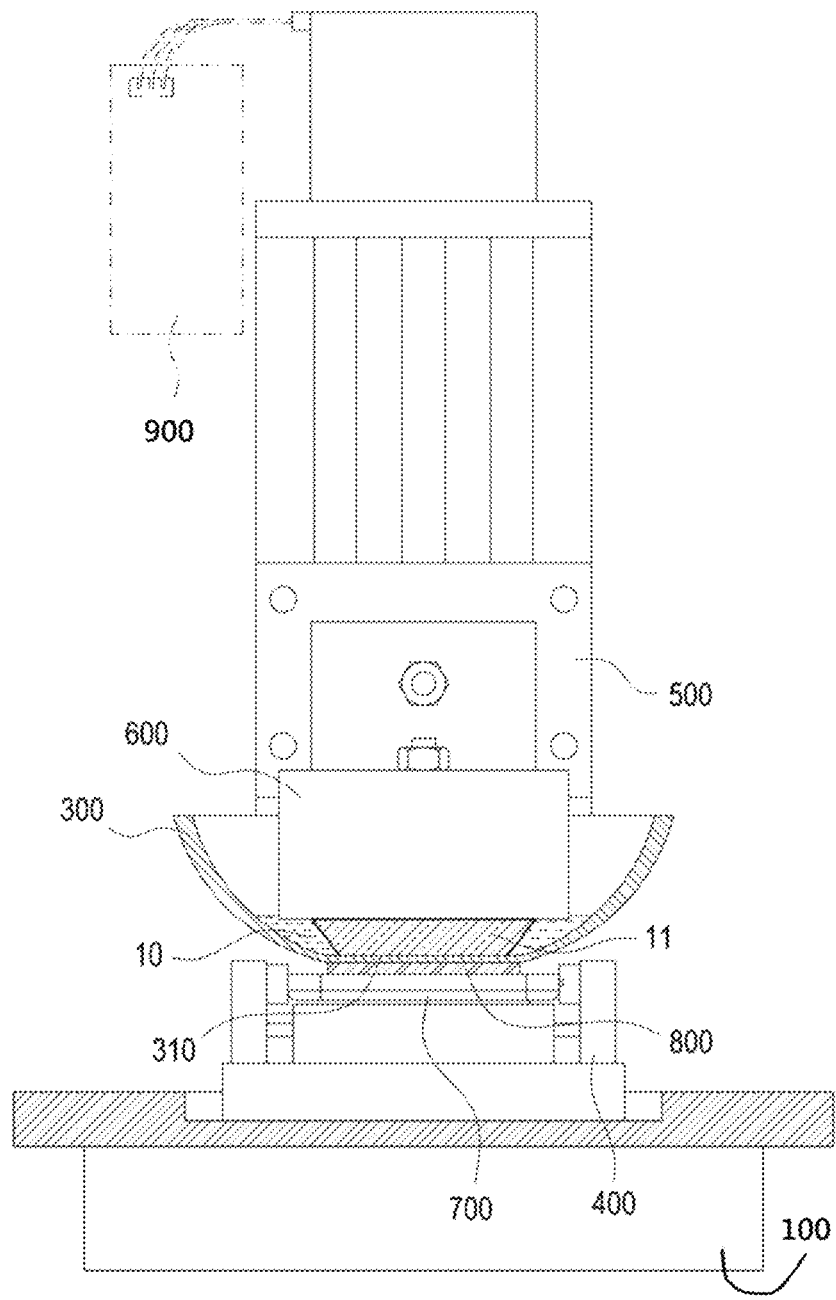
FIG. 5 is a schematic diagram illustrating a three-dimensional printing system in an active state, according to an embodiment of the invention.

FIG. 5 is a schematic diagram illustrating a three-dimensional printing system in an active state, according to an embodiment of the invention. The light emission unit 700 can display a geometrical shape as a mask; the beam in the geometrical shape passes through a condenser lens, by which the beam is adjusted, and then passes through the bottom surface 310 of the accommodation unit 300, and finally projects onto the photocurable resin composition 10 in the accommodation unit 300. For instance, the control unit 900, a device such as a computer, controls the lifting unit 500 according to first displacement of below 7 mm and a first waiting period of within 2.5 min so as to move the formation unit 600. In this manner, a thin layer 11 attached to the formation base 600 is formed in the geometrical shape with a thickness of below 100 μm due to the curing of the photocurable resin composition 10.

Figure 6:
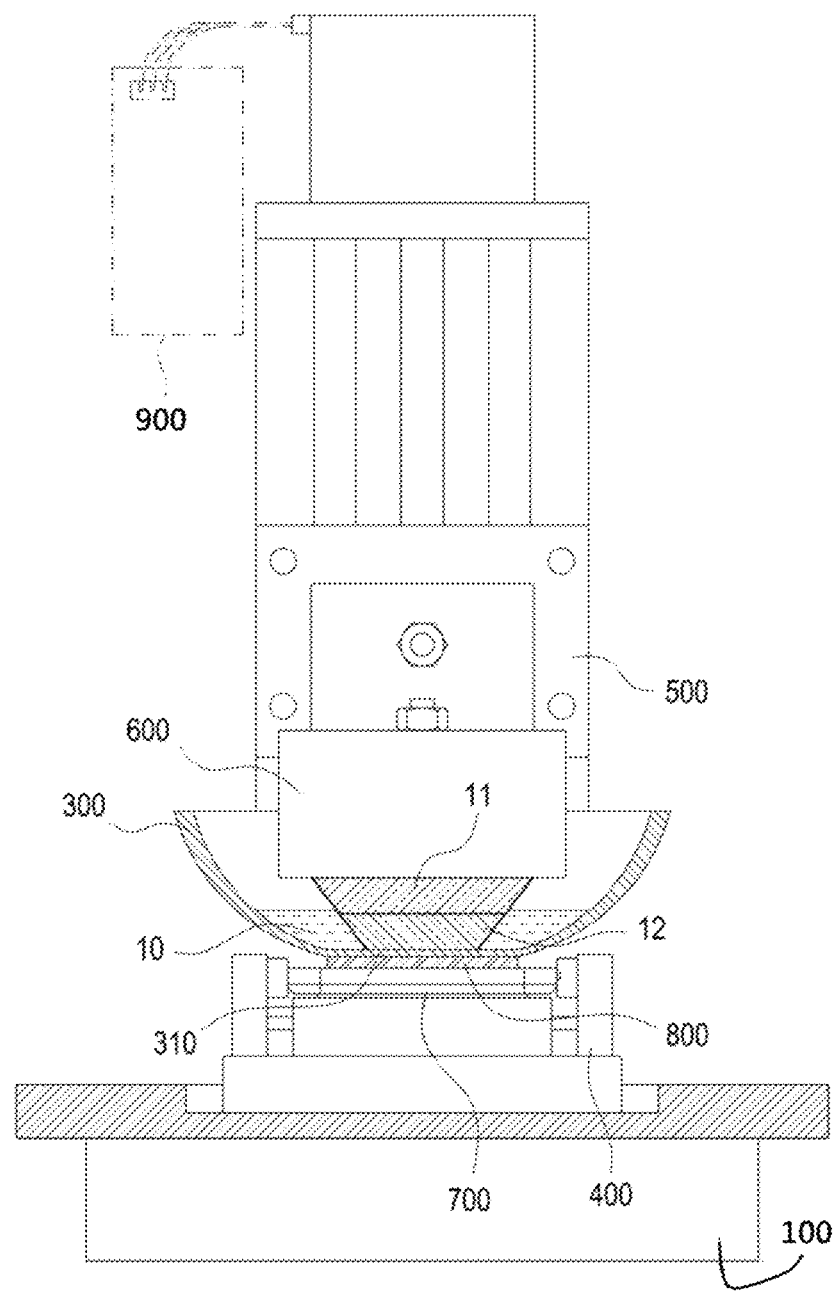
FIG. 6 is a schematic diagram illustrating a three-dimensional printing system in another active state, according to an embodiment of the invention.

Referring to FIG. 6, the mobile electronic device controls the lifting unit 500 to move the formation unit 600 upwards so that the thin layer 11 is moved from the inside of the liquid to a liquid surface of the photocurable resin composition 10. The LCD displays another geometrical shape as a mask; the beam in the geometrical shape projects onto the photocurable resin composition 10 in the accommodation unit 300. The control unit 900 controls the lifting unit 500 according to second displacement of below 4.9 mm and a second waiting period of within 2.5 min so as to move the formation unit 600. In this manner, due to the curing of the photocurable resin composition 10, another thin layer 12 attached to the thin layer 11 is formed in the geometrical shape with a thickness of below 100 μm. Repeating the above steps can form a three-dimensional object by the accumulation of a plurality of thin layers (such as the thin layers 11, 12).

Figure 7:
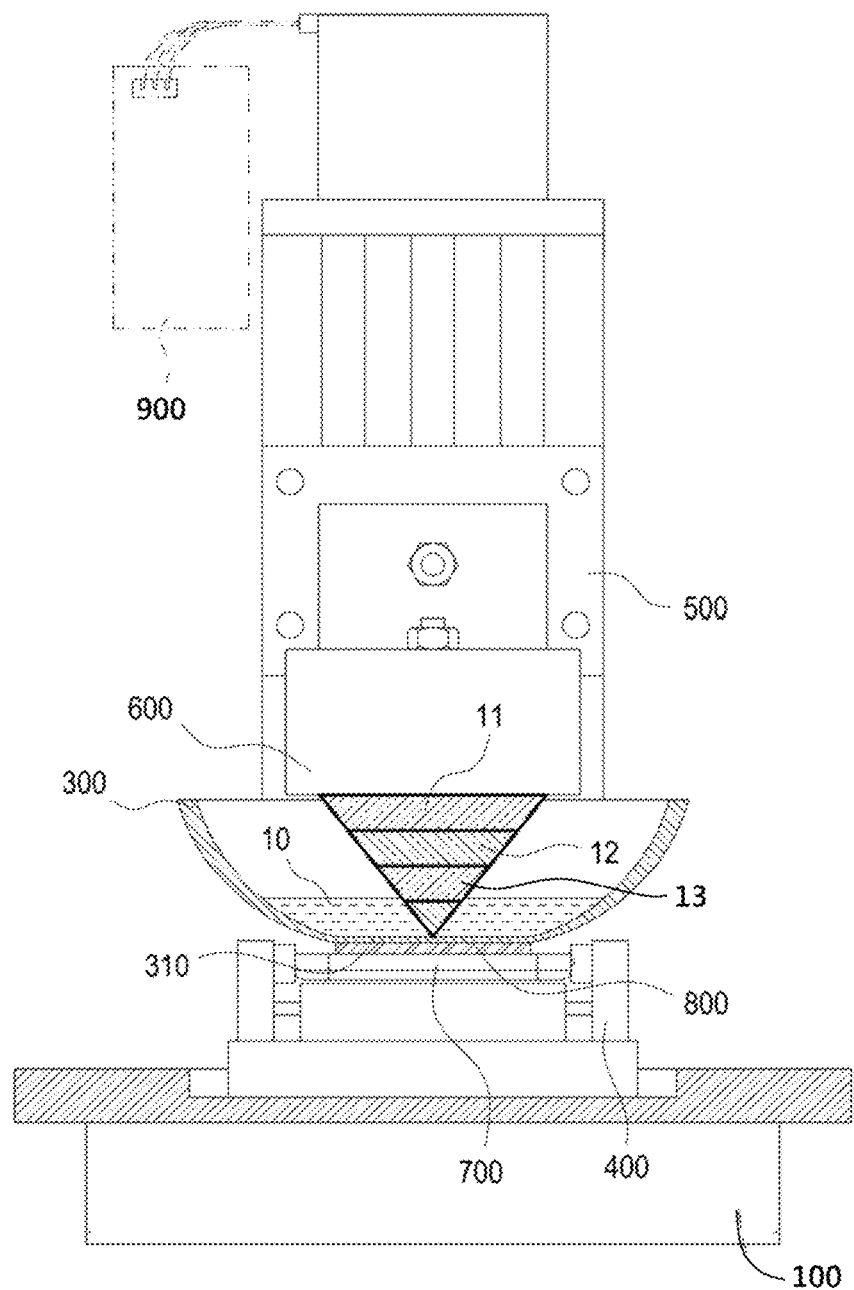
FIG. 7 is a schematic diagram illustrating a three-dimensional printing system in another active state, according to an embodiment of the invention.

Referring to FIG. 7, the control unit 900 controls the lifting unit 500 according to third displacement of below 2 mm and a third waiting period of within 2.5 min so as to move the formation unit 600. In this manner, due to the curing of the photocurable resin composition 10, another thin layer 13 attached to the thin layer 12 is formed with a thickness of below 100 μm. Repeating the above steps can form a three-dimensional object by the accumulation of a plurality of thin layers (such as the thin layers 11, 12, and 13).

In the following, compositions 1-4 will be exemplified in examples 1-4, and three-dimensional objects of a spiral cup, turbine blade, hollowed ball, and star spiral cup will be fabricated by a three-dimensional printing system using the printing material of the photocurable resin compositions of example 1-4, respectively.

Example 1

A composition 1 is prepared by mixing a photosensitive prepolymer (A), a photoinitiator, (B), and an auxiliary photoinitiator, (C) in the ratios as listed in Table 1, dissolving the mixed components with a solvent (D), and then filtering the mixture with a membrane filter made of PTFE (5 μm) filter. In the composition 1, butyl acrylate (e.g., from DOUBLE BOND CHEMICAL IND., CO., LTD.) is taken as the photosensitive prepolymer (A); H-Nu 535, H-Nu 470, H-Nu 635 (e.g., from Spectra Group Limited, Inc.) are taken as the photoinitiator (B); Ethanaminium, N,N,N-trimethyl-2-(1-oxobutoxy)-butyltriphenylborate) (e.g., with a trade name of Borate V, from Spectra Group Limited, Inc.) and N,N-dimethyl acrylamide (e.g., from Spectra Group Limited, Inc.) are taken as the auxiliary photoinitiator (C); dimethylacetamide is taken as the solvent (D).

H-Nu 470, H-Nu 535, H-Nu 635 are based on the structural formula of formula (1), wherein for H-Nu 470, W, X, Y are hydrogen, Z is butoxy; for H-Nu 535, W is hydrogen, X and Y are iodo, Z is hydroxy; for H-Nu 635, W is amino, X and Y are iodo, Z is hydroxy.

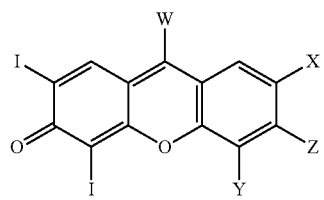

formula (1)

Example 2

A composition 2 is prepared by mixing a photosensitive prepolymer (A), a photoinitiator (B), and an auxiliary photoinitiator (C) in the ratios as listed in Table 1, dissolving the mixed components with a solvent (D), and then filtering the mixture with a membrane filter made of PTFE (5 μm) filter. In the composition 2, isodecylacrylate (e.g., from DOUBLE BOND CHEMICAL IND., CO., LTD.) is taken as the photosensitive prepolymer (A); H-Nu 535, H-Nu 470, H-Nu 635 (e.g., from Spectra Group Limited, Inc.) are taken as the photoinitiator (B); Ethanaminium, N,N,N-trimethyl-2-(1-oxobutoxy)-butyltriphenylborate) (e.g., with a trade name of Borate V, from Spectra Group Limited, Inc.) and N,N-dimethyl acrylamide (e.g., from Spectra Group Limited, Inc.) are taken as the auxiliary photoinitiator (C); dimethylacetamide is taken as the solvent (D).

Example 3

A composition 3 is prepared by mixing a photosensitive prepolymer (A), a photoinitiator (B), and an auxiliary photoinitiator (C) in the ratios as listed in Table 1, dissolving the mixed components with a solvent (D), and then filtering the mixture with a membrane filter made of PTFE (5 μm) filter. In the composition 3, polyethylene glycol acrylate (e.g., from DOUBLE BOND CHEMICAL IND., CO., LTD.) is taken as the photosensitive prepolymer (A); H-Nu 535, H-Nu 470, H-Nu 635 (e.g., from Spectra Group Limited, Inc.) are taken as the photoinitiator (B); Ethanaminium, N,N,N-trimethyl-2-(1-oxobutoxy)-butyltriphenylborate) (e.g., with a trade name of Borate V, from Spectra Group Limited, Inc.) and N,N-dimethyl acrylamide (e.g., from Spectra Group Limited, Inc.) are taken as the auxiliary photoinitiator (C); dimethylacetamide is taken as the solvent (D).

Example 4

A composition 4 is prepared by mixing a photosensitive prepolymer (A), a photoinitiator (B), and an auxiliary photoinitiator (C) in the ratios as listed in Table 1, dissolving the mixed components with a solvent (D), and then filtering the mixture with a membrane filter made of PTFE (5 μm) filter. In the composition 4, butyl acrylate (e.g., from DOUBLE BOND CHEMICAL IND., CO., LTD.) is taken as the photosensitive prepolymer (A); H-Nu 535, H-Nu 470, H-Nu 635 (e.g., from Spectra Group Limited, Inc.) are taken as the photoinitiator (B); Ethanaminium, N,N,N-trimethyl-2-(1-oxobutoxy)-butyltriphenylborate) (e.g., with a trade name of Borate V, from Spectra Group Limited, Inc.) and N,N-dimethyl acrylamide (e.g., from Spectra Group Limited, Inc.) are taken as the auxiliary photoinitiator (C); dimethylacetamide is taken as the solvent (D).

With respect to the photocurable resins of Examples 1 to 4, the following provides the evaluation of miscibility, extinction coefficient, photohardenability, tensile elastic modulus of a cured film, breaking strength, and elongation at break.

Miscibility

Components of each of the photocurable resin compositions obtained above are observed whether the components are dissolved completely. In this manner, it is found that the components of the photocurable resin composition of Example 1 have good miscibility.

Viscosity

E-type viscometer TV-22 (trade name; from TOKI SANGYO CO., LTD., hereinafter referred to as "TV-22") is employed to measure the viscosity of the photocurable resin compositions under 25° C. The viscosities of the compositions 1 to 4 are listed in Table 1.

Photohardenability

Glass substrates of 4 cm$^2$ are prepared. A photocurable resin composition of 0.05 g is dropped on the glass substrate by using a Pasteur pipette, and the glass substrate is overlapped with another one. The amount of cumulative radiation exposure is then measured by using a cumulative light meter UIT-201 equipped with an optical receiver UVD-405PD manufactured by USHIO CO., LTD; e.g., the result is 300 mJ/cm$^2$. The photocurable resin composition, after irradiated by an LCD light source, forms a hardened film. One of the overlapped glass substrates is then stripped and a finger contact with the substrate surface is taken. After that, the surface condition of the hardened film is observed with a microscope. It is found that the hardened film has no traces of the finger at all.

Tensile Elastic Modulus of a Cured Film, Breaking Strength, and Elongation at Break The test below is carried out in accordance with ASTM D882. A photocurable resin composition is dropped on a glass substrate attached with an aluminum foil, and then spin coating (e.g., at a rotational speed of 300 rpm) is performed on the glass substrate, and the glass substrate is received in a replacement tank for use in light irradiation with an LCD light source. The amount of cumulative radiation exposure is then measured by using a cumulative light meter UIT-201 equipped with an optical receiver UVD-405PD manufactured by USHIO CO., LTD; e.g., the result is 300 mJ/cm$^2$.

After irradiation of the LCD light source, the hardened film is peeled from the aluminum foil to prepare test pieces (e.g., 5 mm×25 mm×30 μm). Then, tensile modulus, breaking strength, elongation at break of the hardened film are measured using the EZ Graph (a trade name; manufactured by SHIMADZU CORPORATION), wherein the distance between the chucks is set to 15 mm, and the stretching speed is set to 5 mm/min. The above characteristics are listed in Table 1.

TABLE 1

| Components | Name | Composition 1 Ratio (wt %) | Composition 2 Ratio (wt %) | Composition 3 Ratio (wt %) | Composition 4 Ratio (wt %) |
|---|---|---|---|---|---|
| photosensitive prepolymer (A) | Butyl acrylate | 86.8 | 0 | 0 | 86.7 |
| | Isodecylacrylate | 0 | 86.5 | 0 | 0 |
| | Polyethylene glycol monoacrylate | 0 | 0 | 86.8 | 0 |
| Photoinitiator (B) | H-Nu 470 | 0.1 | 0.2 | 0.1 | 0.2 |
| | H-Nu 535 | 0.1 | 0.3 | 0.1 | 0.1 |
| | H-Nu 635 | 1 | 1 | 1 | 1 |
| Auxiliary photoinitiator (C) | Borate V | 1 | 1 | 1 | 1 |
| | N,N-dimethyl acrylamide | 6 | 6 | 6 | 6 |
| Solvent (D) | Dimethylacetamide | 5 | 5 | 5 | 5 |
| Physical characteristics | Viscosity (mPa · s) | 165 | 132 | 152 | 128 |
| | Elastic modulus (MPa) | 83 | 305 | 76 | 308 |
| | Breaking strength (MPa) | 42 | 23 | 25 | 24 |
| | Elongation at break (%) | 35 | 78 | 98 | 75 |

Example 5

Figure 8:
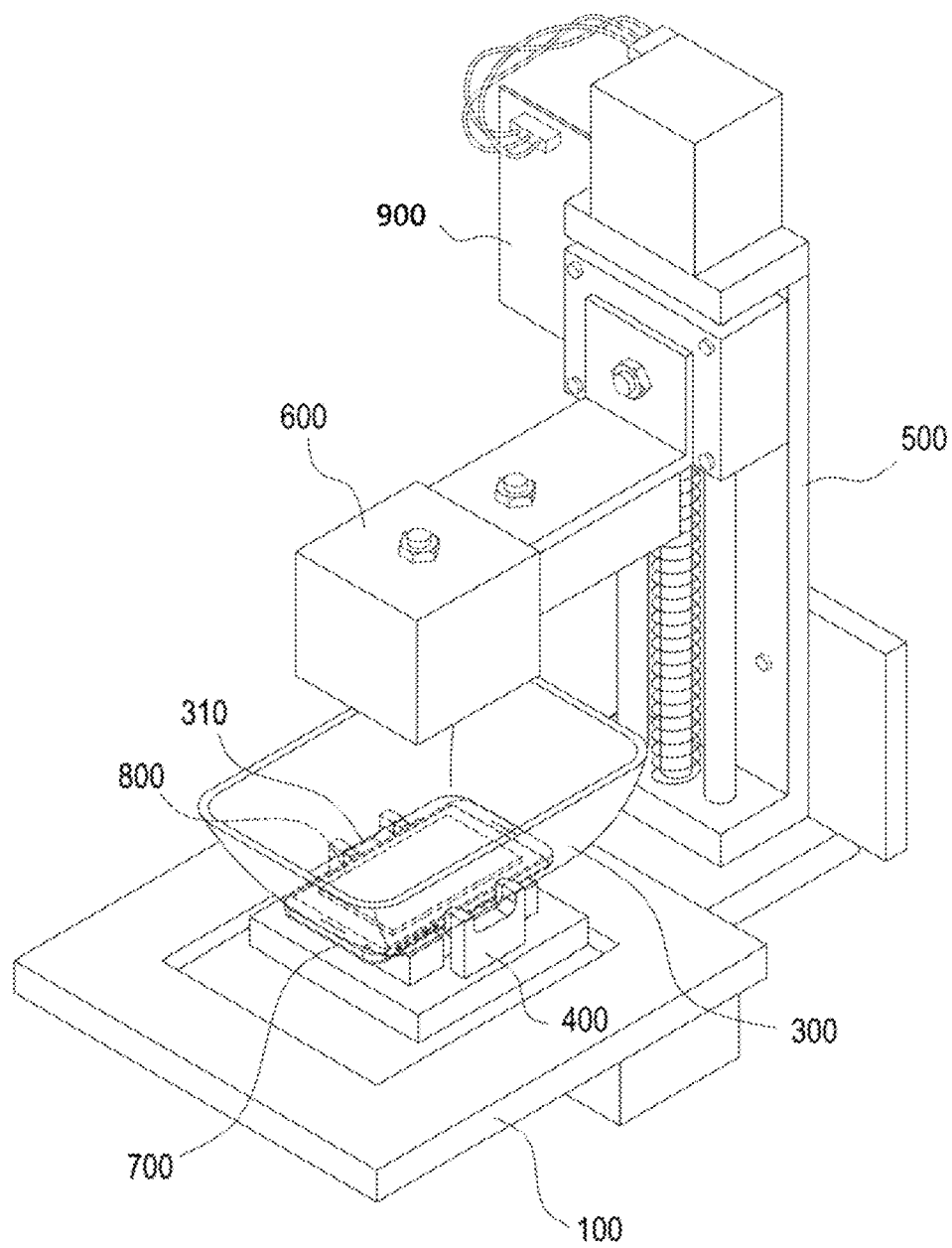
FIG. 8 is a perspective view of a three-dimensional printing system, according to an embodiment of the invention.

Referring to the three-dimensional printing system as illustrated in FIGS. 2 and 8, a three-dimensional CAD drawing file of a spiral cup, which is pre-designed, is converted into an STL (stereolithography) file and slicing is then performed on the STL file, by using slicing software such as Rhino or Netfabb. A slide show program is set for the number of seconds to show each layer image on a mobile phone serving as a light emission unit 700. The accommodation unit 300 is placed over the mobile phone, and a program iDisplay of a computer serving as a control unit 900 is configured to make the screen of the computer being in synchronization with and that of the mobile phone so as to display masks on the screen of the mobile phone. First displacement of 5 mm with a first waiting period of 2.5 min, and second displacement of 4.9 mm with a second waiting period of 2.5 min are set in the computer for controlling the movement of the formation unit 600.

Figure 9:
FIGS. 9 to 12 show finished products of Examples 5 to 8.

The three-dimensional printing system as illustrated in FIG. 8 is utilized for three-dimensional printing. A 10 ml of the composition 1 which is prepared in advance is put into the accommodation unit 300. The mobile phone (the light emission unit 700) is activated to display the screen in synchronization with the screen of the computer, and the screen of the mobile phone is starting to play the drawing file stored in the computer (the control unit 900), whereby the screen of the mobile phone becomes masks. The formation unit 600 begins to move; after the formation unit 600 move upwards for 5 mm and is irradiated by light for 2.5 min, a first layer of photocurable resin composition is hardened, and the formation unit 600 moves upwards so that the photocurable resin composition can be evenly filled in the accommodation unit 300. The hardened resin composition is attached to the formation unit 600. The formation unit 600 with the hardened resin composition is moved downwards for 4.9 mm and is irradiated by light for 2.5 mm so that a second layer of photocurable resin composition is hardened. Repeating the hardening and accumulation of the hardened resin compositions results in the spiral cup, e.g., as shown in FIG. 9, with a layer thickness of 100 μm.

Example 6

In Example 6, the process is similar to Example 5. First displacement of 5 mm with a first waiting period of 2 min, and second displacement of 4.8 mm with a second waiting period of 2 min are set in the computer for controlling the movement of the formation unit 600.

Figure 10:
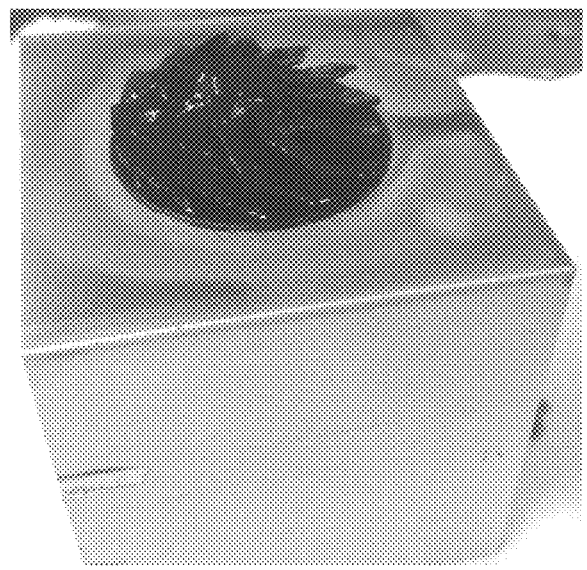

The three-dimensional printing system as illustrated in FIG. 8 is utilized for three-dimensional printing. A 10 ml of the composition 2 which is prepared in advance is put into the accommodation unit 300. The mobile phone (the light emission unit 700) is activated to display the screen in synchronization with the screen of the computer, and the screen of the mobile phone is starting to play the drawing file stored in the computer (the control unit 900), whereby the screen of the mobile phone becomes masks. The formation unit 600 begins to move; after the formation unit 600 move upwards for 5 mm and is irradiated by light for 2 min, a first layer of photocurable resin composition is hardened, and the formation unit 600 moves upwards so that the photocurable resin composition can be evenly filled in the accommodation unit 300. The hardened resin composition is attached to the formation unit 600. The formation unit 600 with the hardened resin composition is moved downwards for 4.8 mm and is irradiated by light for 2 mm so that a second layer of photocurable resin composition is hardened. Repeating the hardening and accumulation of the hardened resin compositions results in a turbine blade, e.g., as shown in FIG. 10, with a layer thickness of 80 μm.

Example 7

In Example 7, the process is similar to Example 5. First displacement of 7 mm with a first waiting period of 2.5 min, second displacement of 4.8 mm with a second waiting period of 2.5 min, and third displacement of 2 mm with a third waiting period of 2.5 min are set in the computer for controlling the movement of the formation unit 600.

Figure 11:
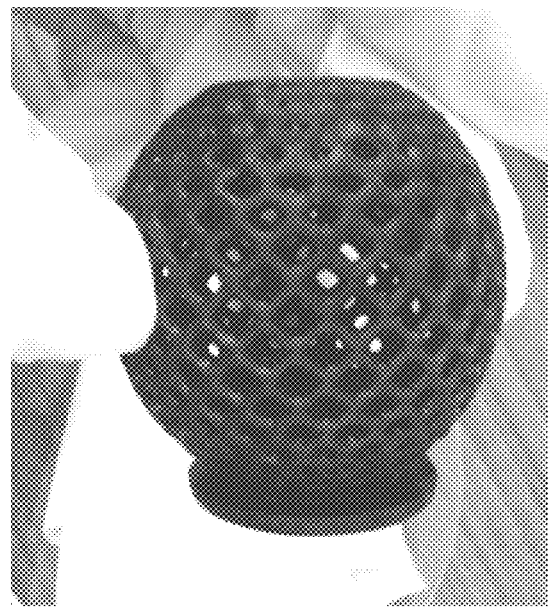

The three-dimensional printing system as illustrated in FIG. 8 is utilized for three-dimensional printing. A 15 ml of the composition 3 which is prepared in advance is put into the accommodation unit 300. The mobile phone (the light emission unit 700) is activated to display the screen in synchronization with the screen of the computer, and the screen of the mobile phone is starting to play the drawing file stored in the computer (the control unit 900), whereby the screen of the mobile phone becomes masks. The formation unit 600 begins to move; after the formation unit 600 move upwards for 7 mm and is irradiated by light for 2.5 min, a first layer of photocurable resin composition is hardened, and the formation unit 600 moves upwards so that the photocurable resin composition can be evenly filled in the accommodation unit 300. The hardened resin composition is attached to the formation unit 600. The formation unit 600 with the hardened resin composition is moved downwards for 4.8 mm and is irradiated by light for 2.5 min so that a second layer of photocurable resin composition is hardened. The formation unit 600 is then moved downwards for 2 mm and is irradiated by light for 2.5 mm so that a third layer of photocurable resin composition is hardened. Repeating the hardening and accumulation of the hardened resin compositions results in a hollowed ball, e.g., as shown in FIG. 11, with a layer thickness of 100 μm.

Example 8

In Example 8, the process is similar to Example 5. First displacement of 6 mm with a first waiting period of 2.5 min, second displacement of 4 mm with a second waiting period of 2.5 min, and third displacement of 2 mm with a third waiting period of 2.5 min are set in the computer for controlling the movement of the formation unit 600.

Figure 12:
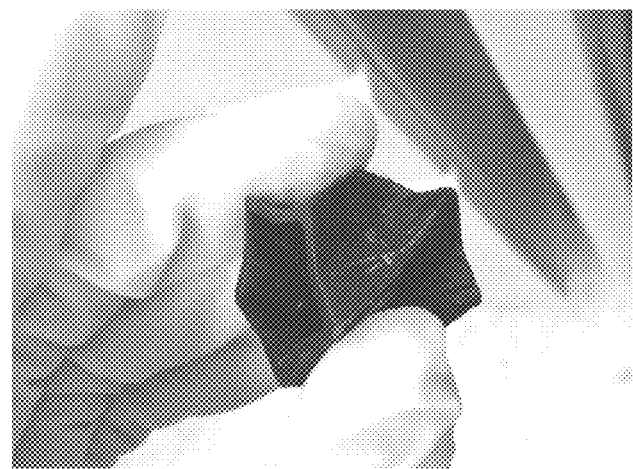

The three-dimensional printing system as illustrated in FIG. 8 is utilized for three-dimensional printing. A 15 ml of the composition 4 which is prepared in advance is put into the accommodation unit 300. The mobile phone (the light emission unit 700) is activated to display the screen in synchronization with the screen of the computer, and the screen of the mobile phone is starting to play the drawing file stored in the computer (the control unit 900), whereby the screen of the mobile phone becomes masks. The formation unit 600 begins to move; after the formation unit 600 move upwards for 6 mm and is irradiated by light for 2.5 min, a first layer of photocurable resin composition is hardened, and the formation unit 600 moves upwards so that the photocurable resin composition can be evenly filled in the accommodation unit 300. The hardened resin composition is attached to the formation unit 600. The formation unit 600 with the hardened resin composition is moved downwards for 4.5 mm and is irradiated by light for 2.5 mm so that a second layer of photocurable resin composition is hardened. The formation unit 600 is then moved upwards for 1.6 mm and is irradiated by light for 2.5 mm so that a third layer of photocurable resin composition is hardened. Repeating the hardening and accumulation of the hardened resin compositions results in a star spiral cup, e.g., as shown in FIG. 12, with a layer thickness of 100 μm.

In the above Examples 5-8, slicing software such as Rhino or Netfabb is employed for conversion into an STL (stereolithography) file and performing slicing on the STL file; however, the invention can be implemented with other programs without limited thereto. In addition, in Examples 5-8, a slide show program is set for the number of seconds to show each layer image on a mobile phone, and a computer serving as a control unit 900 is employed to execute the iDisplay program so that the screen of the computer is in synchronization with and that of the mobile phone so as to display masks on the screen of the mobile phone; however, the invention can be implemented in other different manners without limited thereto.

For example, in some examples, the mobile device (such as smart phones, tablet computers) stores a slicing file or obtains a slicing file from a network, and is installed with a program that is capable of displaying the content of the slicing file for the requirement for three-dimensional printing, and is configured to be able to synchronously communicate with the control unit 900 of the three-dimensional printing system as illustrated in FIG. 1. In this way, as long as the user places the phone in the three-dimensional printing system, the mobile device and the three-dimensional printing system can operate in coordination for three-dimensional printing.

As shown in the above embodiments, the present invention provides photocurable resin compositions that can be hardened by absorbing a visible light having a wavelength in a range of 400 nm to 700 nm, and using the photocurable resin composition as a printing material for a three-dimensional printing system, so that a light emission unit that can display a pattern of a visible light can be served as a mask for the three-dimensional printing. By using the photocurable resin composition according to the present invention, the three-dimensional printing system of the present invention is enabled to utilize the screen of an electronic device capable of displaying a pattern (e.g., an LCD light source of a mobile phone or mobile device) as a light emission unit to display masks. An object can thus be formed by flat formation method, which is fast in formation speed. Further, the three-dimensional printing system according to the invention can print a three-dimensional object by using any photocurable resin composition that can be hardened by absorbing a visible light having a wavelength in a range of 400 nm to 700 nm, not limited to the above examples of compositions.

Because the masks are generated by the visible light source (such as LCD light source), a reduced light projection distance from the visible light source can be configured. In this way, the three-dimensional printing system according to the present invention can be implemented for three-dimensional printing with a large area while a high resolution can be maintained. In addition, as compared with the DLP projection method, the resolution of the three-dimensional system according to the invention will not be deteriorated when the projection area is increased. Further, since the size of the three-dimensional printing system can be reduced due to the reduction of the light projection distance, the three-dimensional printing systems according to the present invention may be implemented as customized, miniaturized, or portable products, thus facilitating further promotion and applications to the industry and general consumers.

It will be apparent to those skilled in the art that various modifications and variations can be made to the present disclosure without departing from the spirit and scope of the disclosure. Thus it is intended that the present disclosure cover the modifications and variations of this disclosure provided they come within the scope of the appended claims and their equivalents.

What is claimed is:

1. A photocurable resin composition for three-dimensional printing, which is visible-light curable and comprising:
   a photosensitive prepolymer in a range of 86.5 wt % to 99.7 wt %, a photoinitiator in a range of 0.01 wt % to 5 wt %, an auxiliary photoinitiator in a range of 0.01 wt % to 15 wt %, and a solvent in a range of 0.01 to 10 wt %, wherein
   the photosensitive prepolymer comprises at least one selected from the group consisting of butyl acrylate, isodecylacrylate, and polyethylene glycol monoacrylate;
   the photoinitiator comprises at least one selected from the group consisting of a fluorone derivatives;
   the auxiliary photoinitiator comprises at least one selected from the group consisting of N,N-dimethyl acrylamide, and Ethanaminium, N,N,N-trimethyl-2-(1-oxobutoxy)-butyltriphenylborate.

2. The photocurable resin composition for three-dimensional printing according to claim 1, wherein the solvent is dimethylacetamide.

3. The photocurable resin composition for three-dimensional printing according to claim 1, wherein the photocurable resin composition is curable through absorption of a visible light with a wavelength in a range of 400 nm to 700 nm.

4. The photocurable resin composition for three-dimensional printing according to claim 2, wherein the photocurable resin composition is curable through absorption of a visible light with a wavelength in a range of 400 nm to 700 nm.

* * * * *